United States Patent
Qi et al.

(10) Patent No.: US 9,292,864 B2
(45) Date of Patent: Mar. 22, 2016

(54) WIRELESS COMMUNICATION DEVICE AND METHODS FOR SYNCHED DISTRIBUTED ADVERTISEMENT FOR DEVICE-TO-DEVICE DISCOVERY

(71) Applicant: Intel Corporation, Santa Clara, CA (US)

(72) Inventors: Emily H. Qi, Portland, OR (US); Roy Ramon, Hod Hasharon (IL); Minyoung Park, Portland, OR (US); Adrian P Stephens, Cottenham (GB); Shuki Perlman, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 13/714,056

(22) Filed: Dec. 13, 2012

(65) Prior Publication Data

US 2013/0346207 A1 Dec. 26, 2013

Related U.S. Application Data

(60) Provisional application No. 61/661,917, filed on Jun. 20, 2012, provisional application No. 61/673,174, filed on Jul. 18, 2012.

(51) Int. Cl.
*G06F 15/173* (2006.01)
*H04W 4/00* (2009.01)
(Continued)

(52) U.S. Cl.
CPC ........... *G06Q 30/0267* (2013.01); *H04W 4/206* (2013.01); *H04W 8/005* (2013.01);
(Continued)

(58) Field of Classification Search
CPC ............... G06Q 30/0267; H04W 52/0216; H04W 52/0219; H04W 52/0229; H04W 8/005; H04W 4/206; H04W 48/16; H04W 56/0015; H04W 84/12; H04W 40/244; H04L 67/16; H04L 67/1061; H04L 67/1044
USPC .................................. 709/224; 370/338, 350
See application file for complete search history.

(56) References Cited

U.S. PATENT DOCUMENTS

| 6,532,368 B1 * | 3/2003 | Hild ................... G06Q 30/02 455/515 |
| 6,842,460 B1 * | 1/2005 | Olkkonen ............ H04W 48/16 370/328 |

(Continued)

FOREIGN PATENT DOCUMENTS

WO WO-2011081705 A2 7/2011
WO WO-2014062251 A1 4/2014

OTHER PUBLICATIONS

Wi-Fi Alliance Technical Committee P2P Task Group; Wi-Fi Peer-to-Peer (P2P) Technical Specification, Version 1.2.*
(Continued)

*Primary Examiner* — Viet Vu
*Assistant Examiner* — Michael A Chambers
(74) *Attorney, Agent, or Firm* — Schwegman Lundberg & Woessner, P.A.

(57) ABSTRACT

Examples of a communication device and methods for synched distributed advertisement for device-to-device are generally described herein. In some embodiments, a method can include transmitting, from a first device of a publishing group, at a group publishing beacon interval (T), a first publishing beacon (PB) including social information of the first device and social information of (N−1) other devices, wherein the group publishing beacon interval (T) represents a preset interval of time between each successive publishing beacon transmission of the publishing group, and wherein the first publishing beacon and the each successive publishing beacon includes a first value representative of the group publishing beacon interval.

16 Claims, 8 Drawing Sheets

(51) Int. Cl.
*G06Q 30/02* (2012.01)
*H04W 4/20* (2009.01)
*H04W 8/00* (2009.01)
*H04W 52/02* (2009.01)
*H04L 29/08* (2006.01)

(52) U.S. Cl.
CPC ...... *H04W52/0216* (2013.01); *H04W 52/0219* (2013.01); *H04W 52/0229* (2013.01); *H04L 67/16* (2013.01)

(56) References Cited

U.S. PATENT DOCUMENTS

| | | | |
|---|---|---|---|
| 7,385,958 B2* | 6/2008 | Demirhan | H04W 74/0808 370/338 |
| 8,503,968 B2* | 8/2013 | Singh | H04W 52/287 455/343.1 |
| 8,909,710 B2* | 12/2014 | Blackstock | H04L 12/1818 709/203 |
| 9,147,340 B2 | 9/2015 | Kim et al. | |
| 2005/0075107 A1 | 4/2005 | Wang et al. | |
| 2005/0254472 A1 | 11/2005 | Roh et al. | |
| 2006/0215601 A1* | 9/2006 | Vleugels | H04W 28/26 370/328 |
| 2008/0031208 A1* | 2/2008 | Abhishek | H04W 52/0225 370/338 |
| 2008/0031209 A1* | 2/2008 | Abhishek | H04W 8/005 370/338 |
| 2008/0031210 A1* | 2/2008 | Abhishek | H04W 8/005 370/338 |
| 2008/0175197 A1* | 7/2008 | Shao | H04W 72/02 370/329 |
| 2008/0175199 A1* | 7/2008 | Shao | H04W 28/26 370/329 |
| 2009/0147768 A1* | 6/2009 | Ji | H04J 3/0664 370/350 |
| 2009/0323647 A1* | 12/2009 | Park | H04W 8/005 370/338 |
| 2010/0111006 A1* | 5/2010 | Zhai | H04W 99/00 370/329 |
| 2011/0142014 A1* | 6/2011 | Banerjee | H04L 63/0869 370/338 |
| 2013/0094536 A1 | 4/2013 | Hui et al. | |
| 2013/0150117 A1* | 6/2013 | Rodriguez | G06T 7/00 455/550.1 |
| 2013/0155925 A1 | 6/2013 | Priyantha et al. | |
| 2013/0163425 A1 | 6/2013 | Hughes et al. | |
| 2013/0172036 A1 | 7/2013 | Miklos et al. | |
| 2014/0115149 A1 | 4/2014 | Kim et al. | |

OTHER PUBLICATIONS

"U.S. Appl. No. 13/713,993, Non Final Office Action mailed Jan. 5, 2015", 14 pgs.
"U.S. Appl. No. 13/713,993, Response filed Apr. 6, 2015 to Non Final Office Action mailed Jan. 5, 2015", 13 pgs.
"U.S. Appl. No. 13/713,993, Response filed Sep. 17, 2014 to Restriction Requirement mailed Jul. 17, 2014", 6 pgs.
"U.S. Appl. No. 13/713,993, Restriction Requirement mailed Jul. 17, 2014", 6 pgs.
"International Application Serial No. PCT/US2013/048706, International Search Report mailed Sep. 27, 2013", 5 pgs.
"International Application Serial No. PCT/US2013/048706, Written Opinion mailed Sep. 27, 2013", 5 pgs.
Xu, Ziqiang, et al., "Reputation-Enhanced QoS-based Web Services Discovery", IEEE International Conference on Web Services, 2007. ICWS 2007., (2007), 249-256.
"U.S. Appl. No. 13/713,993, Notice of Allowance mailed May 26, 2015", 9 pgs.
"International Application Serial No. PCT/US2013/048706, International Preliminary Report on Patentability mailed Apr. 30, 2015", 7 pgs.

* cited by examiner

US 9,292,864 B2

WIRELESS COMMUNICATION DEVICE AND METHODS FOR SYNCHED DISTRIBUTED ADVERTISEMENT FOR DEVICE-TO-DEVICE DISCOVERY

CLAIM OF PRIORITY AND RELATED APPLICATIONS

This application claims the benefit of priority under 35 U.S.C. 119(e) to Park et al., U.S. Provisional Patent Application Ser. No. 61/661,917, entitled, "A SYNCHED DISTRIBUTED ADVERTISEMENT MECHANISM FOR DEVICE-TO-DEVICE DISCOVERY", filed Jun. 20, 2012, hereby incorporated by reference herein in its entirety.

This application claims the benefit of priority under 35 U.S.C. 119(e) to Qi et al., U.S. Provisional Patent Application Ser. No. 61/673,174, entitled, "METHODS AND ARRANGEMENTS FOR INFORMATION DISCOVERY", (Matter Ref: P46143Z), filed Jul. 18, 2012, hereby incorporated by reference herein in its entirety.

TECHNICAL FIELD

Examples pertain to wireless communications. Some examples relate to Common Communication Frame, Device-to-Device discovery, Discovery, IEEE 802.11, Neighbor Awareness Networking, Service Discovery, Social Wi-Fi, and/or Wi-Fi networks.

BACKGROUND

As the number of Wi-Fi-enabled mobile devices increases, there will be an increasing desire on the part of users to be aware of their environs for services and people of interest, using Wi-Fi independent of infrastructure.

In order to publish device's selected social information, the device has to wake up to transmit the social information, which can cause devices to wake up frequently and consumes power. In an environment with a larger total number of devices, it introduces significant communication traffic and channel congestion. Therefore the current approach is not power efficient and not scalable.

DESCRIPTION

Figure 1:
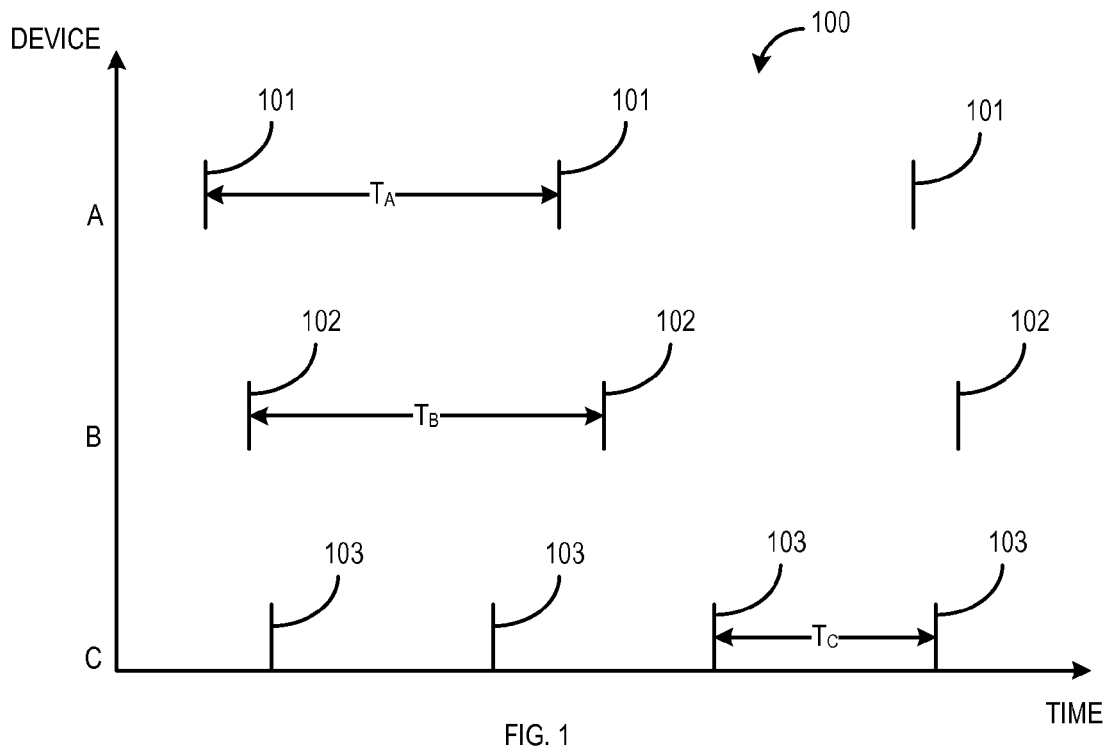
FIG. 1 illustrates an existing approach for publishing social information of one or more devices.

The present inventors have recognized apparatus and methods for sharing, or proving advertisement of, social information associated with a user device, such as a mobile electronic device, in a manner that can save energy and reduce communication traffic. FIG. 1 shows an existing method 100 of sharing social information of one or more devices (A, B, C). The method includes each device broadcasting 101, 102, 103 its own social information periodically. Such a method can cause a device to broadcast often to advertise its own social information and listen often for social information of interest.

Figure 2:
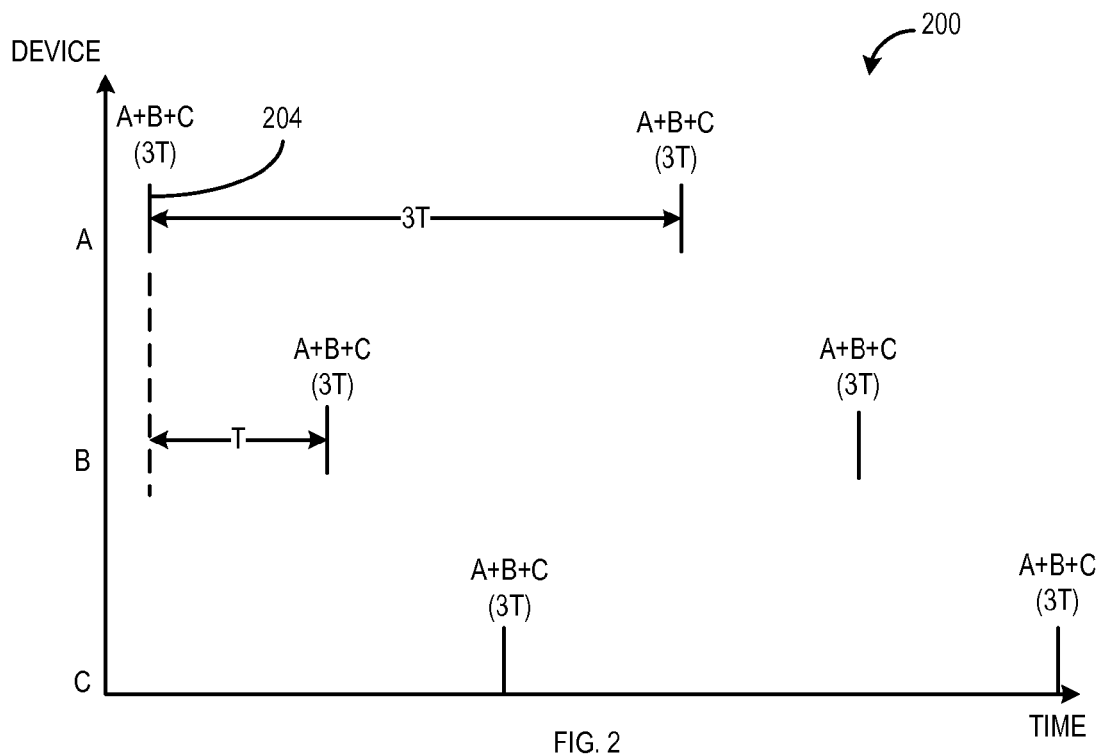
FIG. 2 illustrates generally an example method of publishing social information of a group of devices.

FIG. 2 illustrates generally an example method 200 for coordinated synched broadcasting, or advertisement, of social information for or between one or more devices that can save energy and reduce communication traffic. In certain examples, a group of devices (A+B+C) can take turns broadcasting a publishing beacon 204 associated with the group. The publishing beacon 204 can include at least a portion of the social information associated with each member device of the group. In certain examples, the social information can include information about services available using the group. In certain examples, the publishing beacon 204 can include information identifying the group members (A, B, C). In certain examples, the publishing beacon 204 can include beacon timing information (3T) where T is a publishing beacon interval and is indicative of the interval between each publishing beacon 204.

In certain examples, a device can start a group, or publishing group, by generating and transmitting a publishing beacon advertising at least a portion of the social information associated with the device. The publishing beacon can include a group publishing beacon interval (PBI) or a beacon interval (T), and an indication of a total number of devices belonging to the publishing group (N). In certain examples, the publishing beacon 204 can include a publishing group window (PGW) indicative of an interval of time before transmitting a publishing beacon in which a member of the group can be listening for a join request from a device not belonging to the group. In certain examples, a publishing group can include a single member. In such a case, the PBI can equal T. In certain examples, where there are N members in a publishing group, the PBI can equal N*T.

In certain examples, a device can include an electronic device such as a mobile electronic device. In some examples, a device can include a processor and memory coupled to the processor. In certain examples, the memory can store instructions for execution by the processor. In some examples, the memory can store information for communication with one or more other devices. In some examples, the device can include a wireless communication module for storing and retrieving information using the memory, and can be used to communicably couple one wireless device to another wireless device. In certain examples, the wireless communication module can include a wireless transceiver. In some examples, the wireless communication module can include at least one of the processor, the memory or the transceiver. In certain examples, the transceiver can be arranged to communicate over an IEEE 802.11 wireless network.

Figure 3:
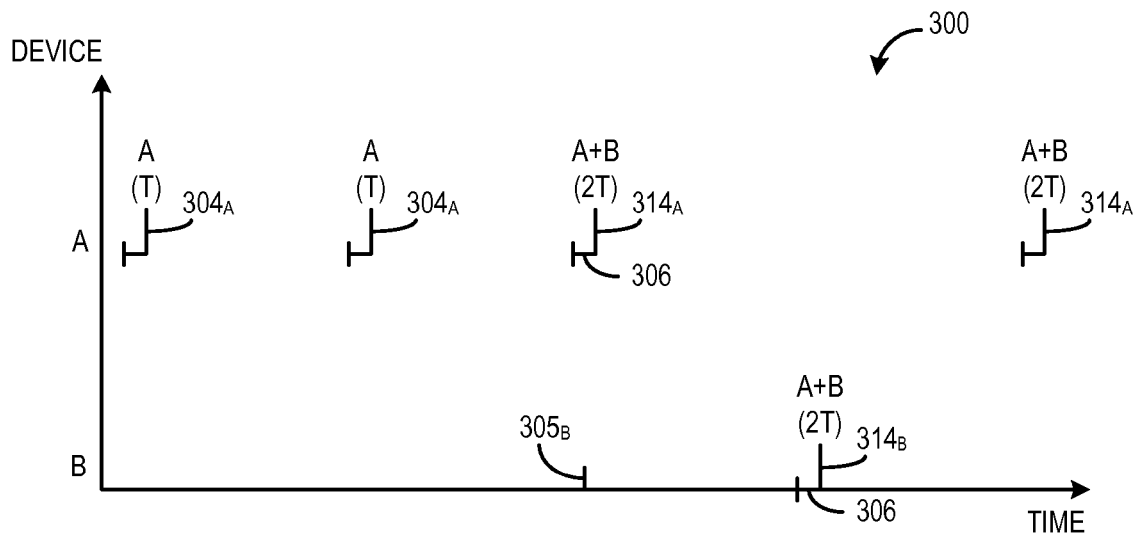
FIG. 3 illustrates generally an example method for forming a group of devices.

FIG. 3 illustrates generally an example method 300 of forming a publishing group. In certain examples, a first device (A) can begin the process of forming a publishing group by generating a first publishing beacon $304_A$ and transmitting the first publishing beacon $304_A$ at a beacon interval (T). A second device (B) can receive the first publishing beacon $304_A$ from the first device (A) and can form a publishing group with the first device (A) by transmitting a join request $305_B$ and having the join request $305_B$ accepted by the first device (A). In certain examples, upon receiving the first publishing beacon $304_A$ from the first device (A), the second device can use the beacon interval (T) and the publishing group window (PGW) information in the first publishing beacon $304_A$ to transmit a join request $305_E$ during a publishing group window (PGW) 306 preceding transmission of a subsequent publishing beacon $304_A$. In certain example, the join request $305_E$ can include at least a portion of the social information associated with the second device (B). In certain examples, where the first device (A) is the only device in the group, upon receiving the join request $305_B$, the first device (A) can transmit a second publishing beacon $314_A$ including identification of the second device (B) such as the social information associated with the second device (B) received with the join request $305_B$. In certain examples, the second publishing beacon $314_A$ can provide an indication to the second device (B) that the second device (B) has been accepted by the group. In certain examples, the second publishing beacon $314_A$ includes timing adjustments for subsequent publishing beacons. For example, upon being accepted by the first device (A), the number of members of the group (N) can be increased, and the group publishing beacon interval (PBI) can be increased such that each device can transmit a publishing beacon ($314_A$, $314_B$) at an interval of N*T, thus allowing longer sleep intervals for each device between transmitting a publishing beacon. Longer sleep intervals can conserve energy and reduce communication traffic.

In certain example, a device can decide to join a group by comparing social information received in a publishing beacon with desired social information stored within the device. In certain examples, the desired social information can represent desired services a user of the device may want to use at certain times or be associated with if the services are available. In some examples, the desired social information can represent characteristics of groups the user desires to be made aware of if available. In some examples, the social information can represent common interests or functionalities the user desires or has recently or frequently scanned for. In certain examples, a group may reject a member because of conflicts with other members, because a group is at a membership capacity in general, or because a group is at a membership capacity for members that have certain social characteristics, for example.

Figure 4:
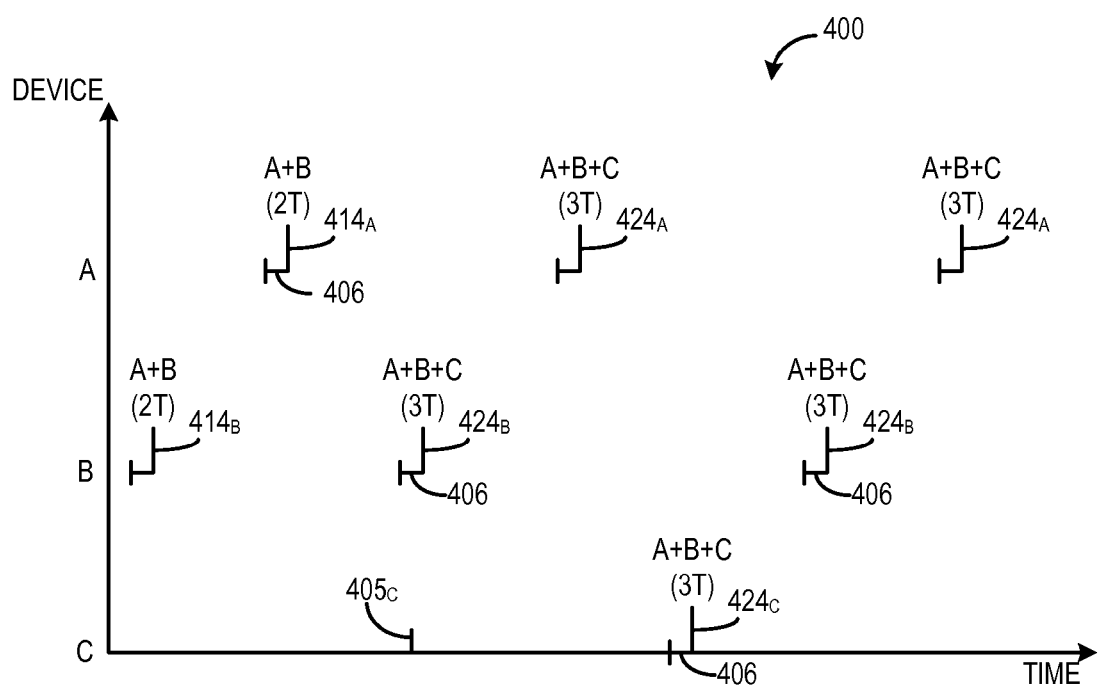
FIGS. 4 and 5 illustrate generally example methods of expanding a group of devices.

FIG. 4 illustrates generally an example method 400 for expanding publishing group membership where any member of the publishing group can accept a new member. In the illustrated example, an existing group (A+B) can include two members, a first member (A) and a second member (B). It is understood that it is possible for a group to include additional members without departing from the scope of the present subject matter. The first and second members (A, B) of the publishing group can alternately broadcast a publishing beacon $414_A$, $414_B$ at a beacon interval (T) such that each member need only transmit a publishing beacon at a rate corresponding to a group publishing group beacon interval (PBI), where in the illustrated example the initial PBI of each device=2T.

Upon receiving a publishing beacon $414_A$, $414_B$ from the group (A+B), a third device (C) can transmit a join request $405_C$ during a publishing group window 406 preceding a subsequent publishing beacon transmission $424_B$. In the illustrated example, the second device (B) can wake up prior to transmitting the next publishing beacon $424_B$ to listen for join requests during the publishing group window 406. Upon receiving the join request $405_C$ from the third device (C), the second device (B) can accept the third device (C) into the group by incrementing the number of members of the group (N), and generating and transmitting a publishing beacon $424_B$, including social information associated with the third device (C). In certain examples, upon receiving the publishing beacon $424_B$ of the second device (B) including the social information associated with the third device (C), the third device (C) can schedule a wake-up alarm for transmitting the third device's first publishing beacon $424_C$ as a member of the group (A+B+C). In certain examples, the third device (C) can transmit a first publishing beacon $424_C$ at a time corresponding to an interval of N*T after the second device (B) transmits the publishing beacon $424_B$ indicating acceptance of the third device (C) to the group, where N represents the number of members in the group when the join request was transmitted. Thereafter, the members (A, B, C) of the publishing group can alternately broadcast a publishing beacon $424_A$, $424_B$, $424_C$ at a beacon interval (T) such that each member need only transmit a publishing group beacon at a rate corresponding to a group publishing beacon interval (PBI), where the group publishing beacon interval (PBI) is about N*T, N corresponding to the number of members in the group.

Figure 5:
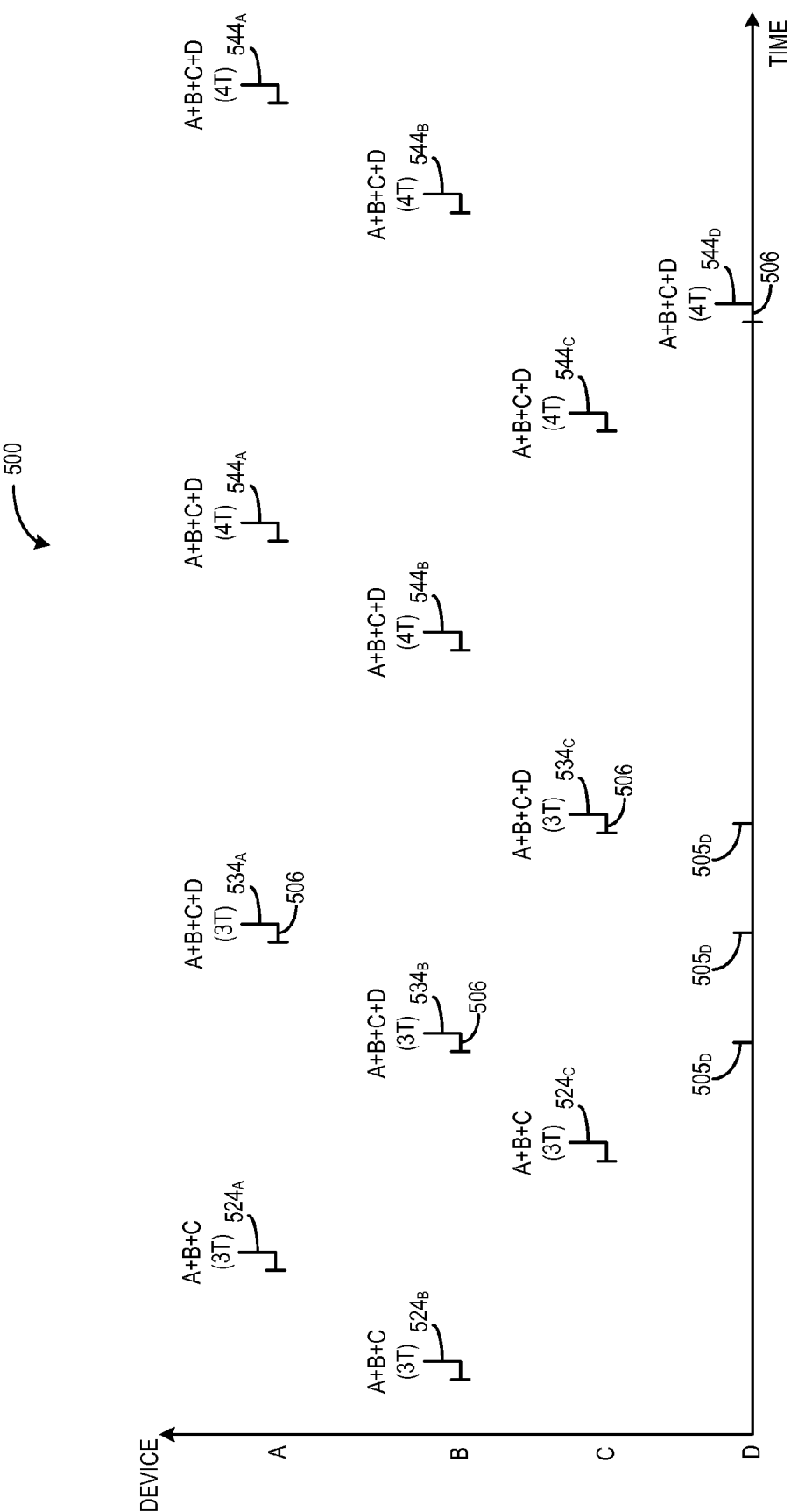

FIG. 5 illustrates generally an example method 500 for expanding publishing group membership where all members of the publishing group are expected to accept a new member before the new member is accepted as a member of the group. In the illustrated example, an existing group (A+B+C) can include three members, a first member (A), a second member (B), and a third member (C). It is understood that it is possible for a group to include more or less members without departing from the scope of the present subject matter. The members (A, B, C) of the publishing group can alternately broadcast a publishing beacon $524_A$, $524_B$, $524_C$ at a beacon interval (T) such that each member need only transmit a publishing group beacon at a rate corresponding to a group publishing beacon interval (PBI), where the group publishing beacon interval (PBI) is about N*T, N corresponding to the number of members in the group.

Upon receiving one or more publishing beacons $524_A$, $524_B$, $524_C$ from the group (A+B+C), a fourth device (D) can transmit a join request $505_D$ during a publishing group window 506 preceding a subsequent publishing beacon transmission. In the illustrated example, the second device (B) can wake up prior to transmitting the next publishing beacon $534_B$ to listen for join requests during the corresponding publishing group window 506. Upon receiving the join request $505_D$ from the fourth device (D), the second device (B) can accept the fourth device (D) by generating and transmitting a publishing beacon $534_E$ including social information associated with the fourth device (D). In certain examples, the fourth device (D) can transmit subsequent join requests $505_D$ during the publishing group window 506 associated with each other device of the group (A+B+C). For acceptance, each member of the group can generate and publish a publishing beacon $534_A$, $534_B$, $534_C$ including the social information associated with the fourth device (D) in response to receiving the join requests $505_D$ of the fourth device (D). In some examples, the fourth device (D) is not accepted as a member of the group until all existing members (A+B+C) of the group receive a join request $505_D$ from the fourth device (D) and transmit a publishing beacon $534_A$, $534_B$, $534_C$ including the social information associated with the fourth device (D). After all existing members of the group accept the join request $505_D$ of the fourth device (D), the total number of devices in the group (N) can be incremented by 1 and the publishing beacon interval (PBI) can be increased by a beacon interval (T). In certain examples, the fourth device (D) can transmit a first publishing beacon 544$_D$ at a time corresponding to an interval of 2*N*T after the second device (B) transmits the first publishing beacon 534$_B$ indicating acceptance of the fourth device (D). In such examples, N can represent the total number of members in the group when the first join request 505$_D$ was transmitted by the fourth device (D) during the publishing group window 506 of the second device (B). Thereafter, the members (A, B, C, D) of the publishing group can alternately broadcast a publishing beacon 544$_A$, 544$_B$, 544$_C$, 544$_D$ at a beacon interval (T) such that each member need only transmit a publishing group beacon at a rate corresponding to a group publishing beacon interval (PBI), where the group publishing beacon interval (PBI) is about N*T, N corresponding to the total number of members in the group.

In certain examples, if a member does not accept a join request, the joining member can wait at least an interval of N*T before transmitting another join request. Decisions by existing members of a group to accept a joining member can be based on a number of factors including, but not limited to, whether an upstream device accepted the joining member, whether the receiving signal strength indication (RSSI) of a join request is of sufficient strength, other proximity parameters, maximum group membership, preferences of existing group members, or combinations thereof.

Figure 6:
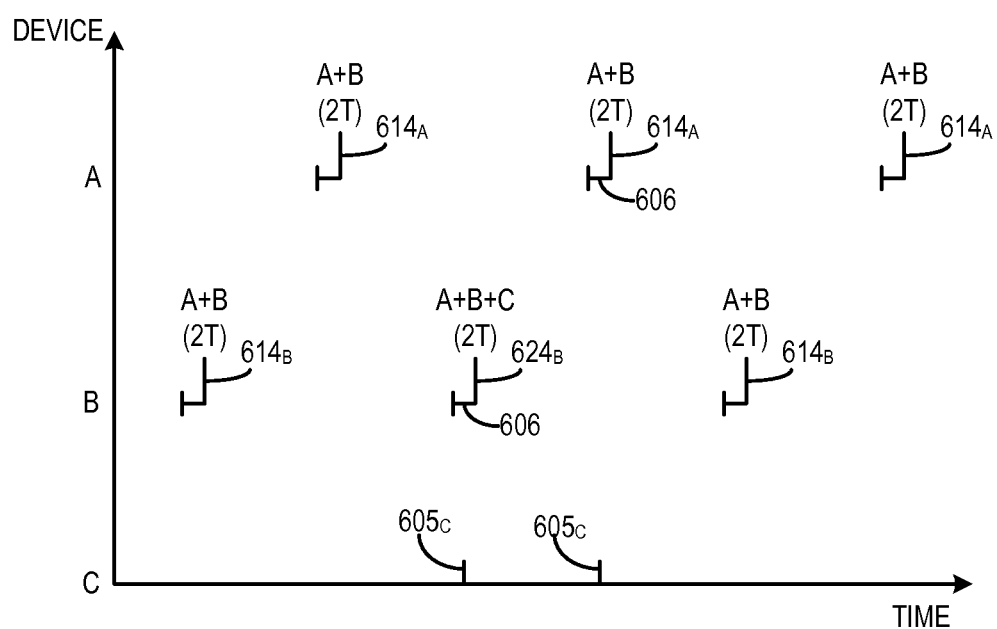
FIG. 6 illustrates generally an example method for rejecting a join request.

FIG. 6 illustrates generally a first member device (A) not accepting a joining member (C) in a group where acceptance to a group can depend on acceptance by all existing members (A, B) of the group. In the illustrated example, an existing group (A+B) can include two members, a first member (A) and a second member (B). It is understood that it is possible for a group to include more or less members without departing from the scope of the present subject matter. The members (A, B) of the publishing group can alternately broadcast a publishing beacon 614$_A$, 614$_E$ at a beacon interval (T) such that each member need only transmit a publishing beacon at a rate corresponding to a group publishing beacon interval (PBI). In such examples, the group publishing beacon interval (PBI) can be about N*T, N corresponding to the number of members in the group.

Upon receiving one or more publishing beacons from the group (A+B), a third device (C) can transmit a join request 605$_C$ during a publishing group window 606 preceding a subsequent publishing beacon transmission. In the illustrated example, the second device (B) can wake up prior to transmitting the next publishing beacon 624$_B$ to listen for join requests during the corresponding publishing group window 606. Upon receiving the join request 605$_C$ from the third device (C), the second device (B) can accept the third device (C) by generating and transmitting a publishing beacon 624$_B$, including social information associated with the third device (C). The third device (C) can transmit a subsequent join request during the publishing group window 606 associated with the first device (A). The first device (A) can reject the third device (C) by transmitting, or publishing, a publishing beacon 614$_A$ that does not include the social information of the third device (C) in response to the subsequent join request 605$_C$ transmitted during the publishing group window 606 corresponding to the first device (A). When the join request of the third device (C) is rejected, the existing members (A, B) of the publishing group can continue to broadcast a publishing beacon 614$_A$, 614$_E$ at a beacon interval (T).

In certain examples, a first member device that transmits a first publishing beacon one beacon interval (T) prior to a second member device transmitting a second publishing beacon, is called an "up-chain" device of the second member device. In certain examples, a second member device that transmits a second publishing beacon one beacon interval (T) after a first member device transmits a first publishing beacon, is called an "down-chain" device of the first member device. In certain examples, once a join request is accepted (e.g. an existing member device includes the social information of a joining device in a publishing beacon and the group publishing beacon interval (PBI) is increased by a beacon interval (T)), the joining member can start to transmit a publishing beacon at an interval of N*T after the existing member device increases the group publishing beacon interval (PBI). In such an example, N can be the total number of devices in the group before the joining device is accepted. In some examples, once a joining member becomes a member of the publishing group, the joining member can be inserted in the "chain" of member devices as an "up-chain" device of the existing member device that first accepted the joining device.

Figure 7:
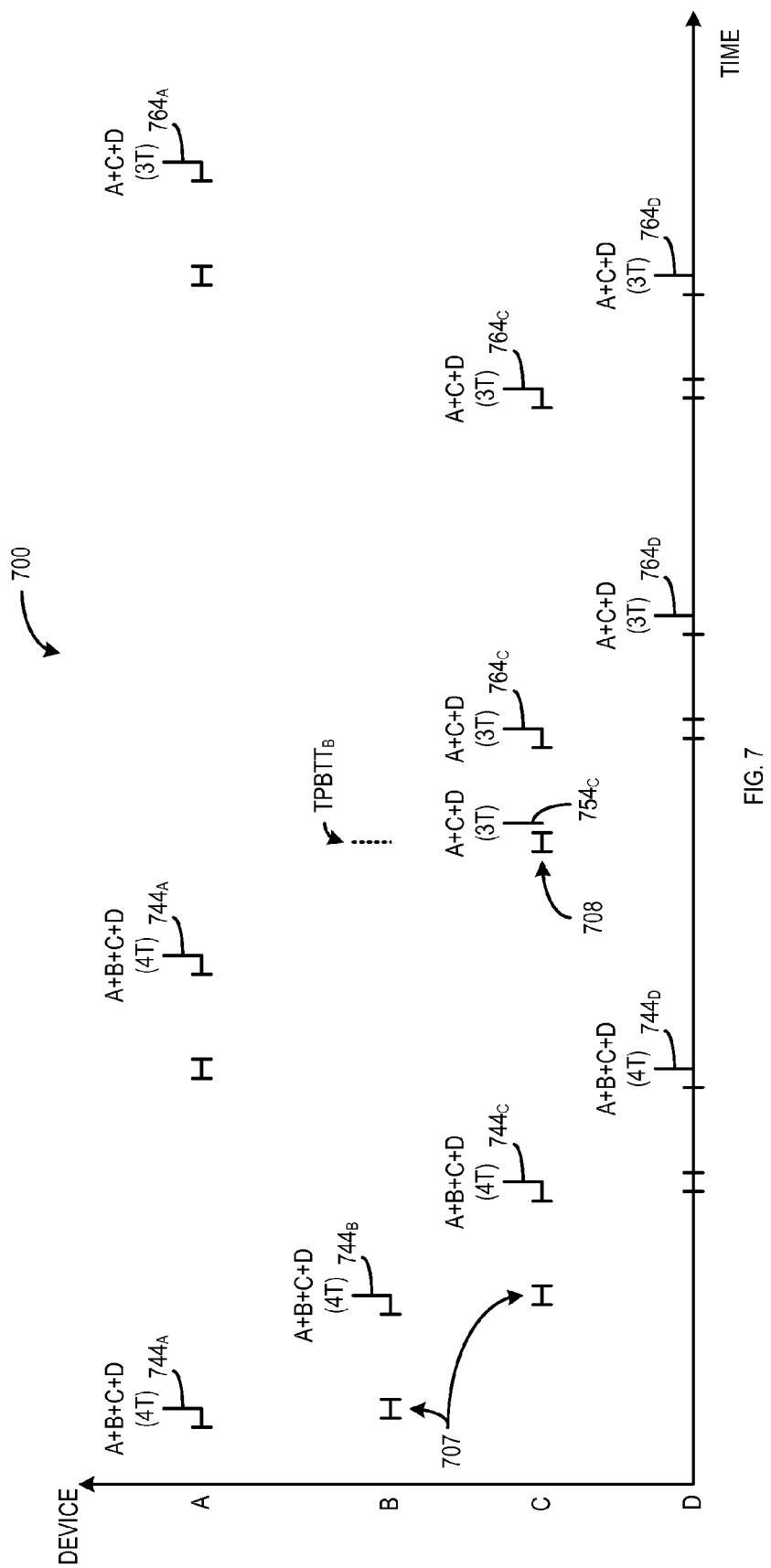
FIG. 7 illustrates generally a method of detecting and responding to a device leaving a group.

FIG. 7 illustrates generally and example method 700 for detecting and responding to a device leaving a group. In certain examples, a member device (e.g. a device belonging to a group or forming a group) can wake from a sleep mode to receive join requests just prior to transmitting a publishing beacon. In some examples, a member device can wake from a sleep mode to receive a publishing beacon from an immediately up-chain device. The member device can then use the information in the publishing beacon to update local parameters such as parameters associated with the number of devices in the group and parameters associated with timing adjustments for the publishing beacon. The member device can propagate any new information, such as a device leaving the group, down the chain.

In the illustrated example of FIG. 7, a group including four members (A, B, C, D) can alternately transmit a publishing beacon 744$_A$, 744$_B$, 744$_C$, 744$_D$ at a beacon interval (T). In certain examples, each member device (A, B, C, D) can wake from a sleep mode (707) to receive a publishing beacon from an immediately up-chain device. If a member device fails to receive a publishing beacon from an immediately up-chain device one or more times, the member device can assume the up-chain device has left the group. For example, as illustrated at 708, the third device (C) fails to receive a publishing beacon from the second device (B). In certain examples, the member device can awake from the sleep mode during the publishing group window of the up-chain device and begin listening for the publishing beacon. In some examples, if the publishing beacon of the up-chain device (B) is not received by the down chain device (C) at the target publishing beacon transmit time (TPBTT) of the up-chain device (B), the down chain device (C) can transmit a replacement publishing beacon 754$_C$ just after the TPBTTB of the up-chain device (B). The replacement publishing beacon 754$_C$ can provide adjustment information for the group to account for a member leaving the group. After transmitting the replacement publishing beacon 754$_C$, the down chain device (C) can transmit its own publishing beacon 764$_C$ at its own TPBTT approximately a beacon interval (T) after transmitting the replacement publishing beacon 754$_C$. In certain examples, the replacement publishing beacon 754$_C$ does not include the social information of the up-chain device (B) that did not transmit a publishing beacon. In some examples, the replacement publishing beacon 754$_C$ indicates that the number of devices belonging to the group has decreased by one member. In certain examples, the three remaining members of the group can commence to sequentially transmit a publishing beacon 764$_A$, 764$_C$, 764$_D$ at a beacon interval (T). In certain examples, anticipated consecutive publishing beacons of an up-chain device may be missed two or more times before the member device can assume the up-chain device has left the group. In some examples, the number of missed publishing beacons from an up-chain device can be provided by a threshold parameter such as a programmable threshold parameter.

In certain examples, interactions between devices can be broken down into three phases: a publishing phase, a contact phase, and an exchange phase.

The publishing phase can be used to advertise brief information about a device in a publishing beacon frame. Devices can transmit a publishing beacon at publishing beacon interval (PBI). A publishing beacon (PB) can be a "reliable" group addressed frame. The publishing beacon can be transmitted by a member device to advertise group information. In certain examples, an immediately "down-chain" device can transmit an acknowledgement (ACK) when the immediately downstream device receives a publishing beacon frame from an immediately "up-chain" device. If there is no ACK received from the down-chain device, the "up-chain" device can re-transmit the publishing beacon. In some examples, the "up-chain" device can re-transmit the publishing beacon until a retry limit is exceeded. In certain examples, a new device may want to join a publishing group by sending a join request during a publishing group window. The receiving device that belongs to the publishing group and wakes up at the publishing group window can transmit an ACK to the joining device. The receiving device can use RSSI of a associated received publishing beacon, transmit power (TxPwer) and RSSI of the join request to decide whether the new device is in the proximity, and then decide whether to accept the join request or not. The device that received the join request can transmit a join response to the new device. In certain examples, a member device receiving a join request from a new device can decide whether the new device is accepted or not, based on proximity information, such as, but not limited to a receiving signal strength of a previous publishing beacon and transmit power information of the new device.

The contact phase can include requests for contact transmitted by member devices. For example, if a member device is interested in a service published in a publishing beacon, the interested device can awake from a sleep mode at the TPBTT of a target device having the service to receive a publishing beacon of the target device. After receiving the publishing beacon of the target device, the interested device can transmit a contact request during a contact window. In certain examples, the contact window can be an interval of time after transmission of a publishing beacon. In certain examples, a publishing beacon can include information to allow a device to schedule a contact request during a contact window. Upon receipt of a contact request, the target device can transmit a contact response to provide corresponding service information. In certain examples, if a contact request is not received during a contact window of a device, the device can switch to a sleep mode to conserve energy. In some examples, if a device has successfully transmitted or received a contact request the device remains awake for the exchange phase.

In certain examples, the exchange phase can include data exchanges between the interested device and the target device. The data exchanges can include, but are not limited to, GAS, ANQP, Association, RSNA authentication, or combinations thereof. In certain examples, exchange of data during the exchange phase can take place within the contact window.

Figures 8, 9, 10:
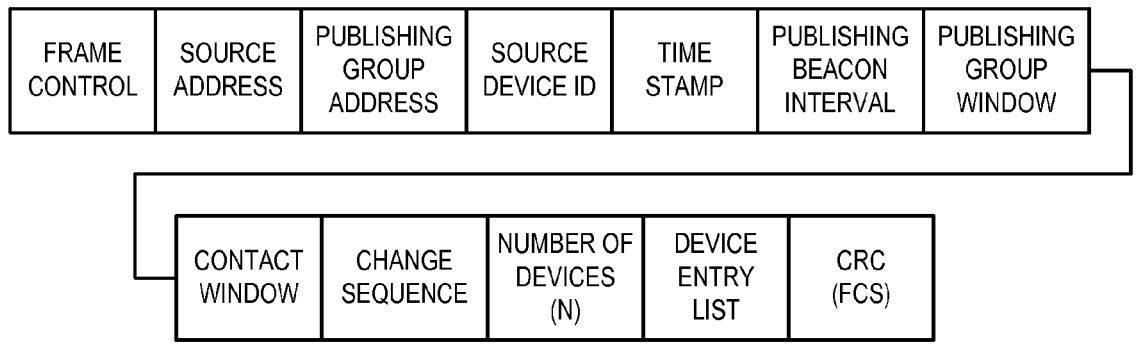
FIG. 8 includes a publishing beacon format according to one example of the present subject matter.
FIG. 9 illustrates generally a join request format according to one example of the present subject matter.
FIG. 10 illustrates generally a join response format according to one example of the present subject matter.

FIG. 8 includes a publishing beacon format according to one example of the present subject matter. It is understood that a publishing beacon can include more or less format items without departing from the present subject matter. In an example, a publishing beacon format can include one or more of the following attributes: Frame Control; Source Address; Publishing Group Address, which can include a multicast group's media access control (MAC) address to identify a publishing group; Source Device Address, which can be set to zero if the device is the only device in the group; Timestamp, which can indicate the time stamp of the device that initiates the group; Publishing beacon interval (PBI) as discussed above; Publishing Group Window as discussed above; Contact Window as discussed above; Change Sequence, which can indicate a change in the Device entry list; Number of Devices (N) in the group; and Device Entry List, which can indicate the order of the group's device chain. The Device Entry List can include multiple service information entries associated with each device. In certain examples, the publishing beacon can also include an error detection code such as a circular redundancy check (CRC) code or a frame check sequence (FCS) code.

FIG. 9 illustrates generally a join request format according to one example of the present subject matter. It is understood that a join request can include more or less format items without departing from the present subject matter. In an example, a join request format can include one or more of the following attributes: Frame Control; Target Address indicating the publishing group address of the target publishing group; Source Address, which can provide the joining device's MAC address; Received Device ID indicating the ID of the device from which the publishing beacon was received; RSSI of Received Publishing Beacon, which can provide an indication of the received signal strength of the received publishing beacon; and Tx Power, which can indicate the power used to transmit the present join request.

FIG. 10 illustrates generally a join response format according to one example of the present subject matter. It is understood that a join response can include more or less format items in varying arrangements without departing from the present subject matter. In an example, a join response format can include one or more of the following attributes: Frame Control; Target Address indicating the device address providing the response; Source Address, which can provide the joining device's MAC address; Publishing Group Address, which can provide the publishing group address of the target publishing group; Device ID indicating the device ID of the joining device if accepted otherwise set to zero to indicate the device is rejected; and Reject Reason, which can indicate why the joining device was rejected; for example, Reject Reason can be set to a value indicating the joining device is within a range that could cause a potential hidden node.

Figure 11:
FIG. 11 illustrates generally a contact request format according to one example of the present subject matter.

FIG. 11 illustrates generally a contact request format according to one example of the present subject matter. It is understood that a contact request can include more or less format items without departing from the present subject matter. In an example, a contact request format can include one or more of the following attributes: Frame Control; Target Address indicating the device MAC address of the device targeted for the contact request; Source Address indicating the MAC address of the device making the contact request; Device ID, which can provide the group device ID of the target device; and a Service Entry List, which can include one or more services that are of interest to the requesting device or user of the requesting device.

Figure 12:
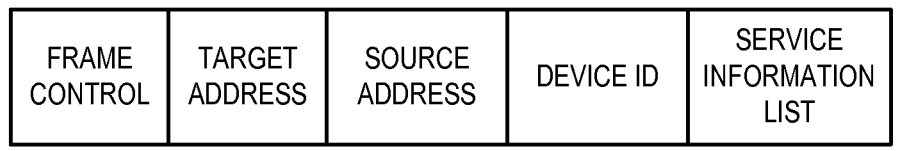
FIG. 12 illustrates generally a contact response format according to one example of the present subject matter.

FIG. 12 illustrates generally a contact response format according to one example of the present subject matter. It is understood that a contact response can include more or less format items in varying arrangement without departing from the present subject matter. In an example, a contact response format can include one or more of the following attributes: Frame Control; Target Address indicating the device MAC address of the device targeted for the contact request; Source Address indicating the MAC address of the device making the contact request; Device ID, which can provide the group device ID of the target device; and a Service Information Entry List, which can include more detailed service information associated with services available from the target device.

Figure 13:
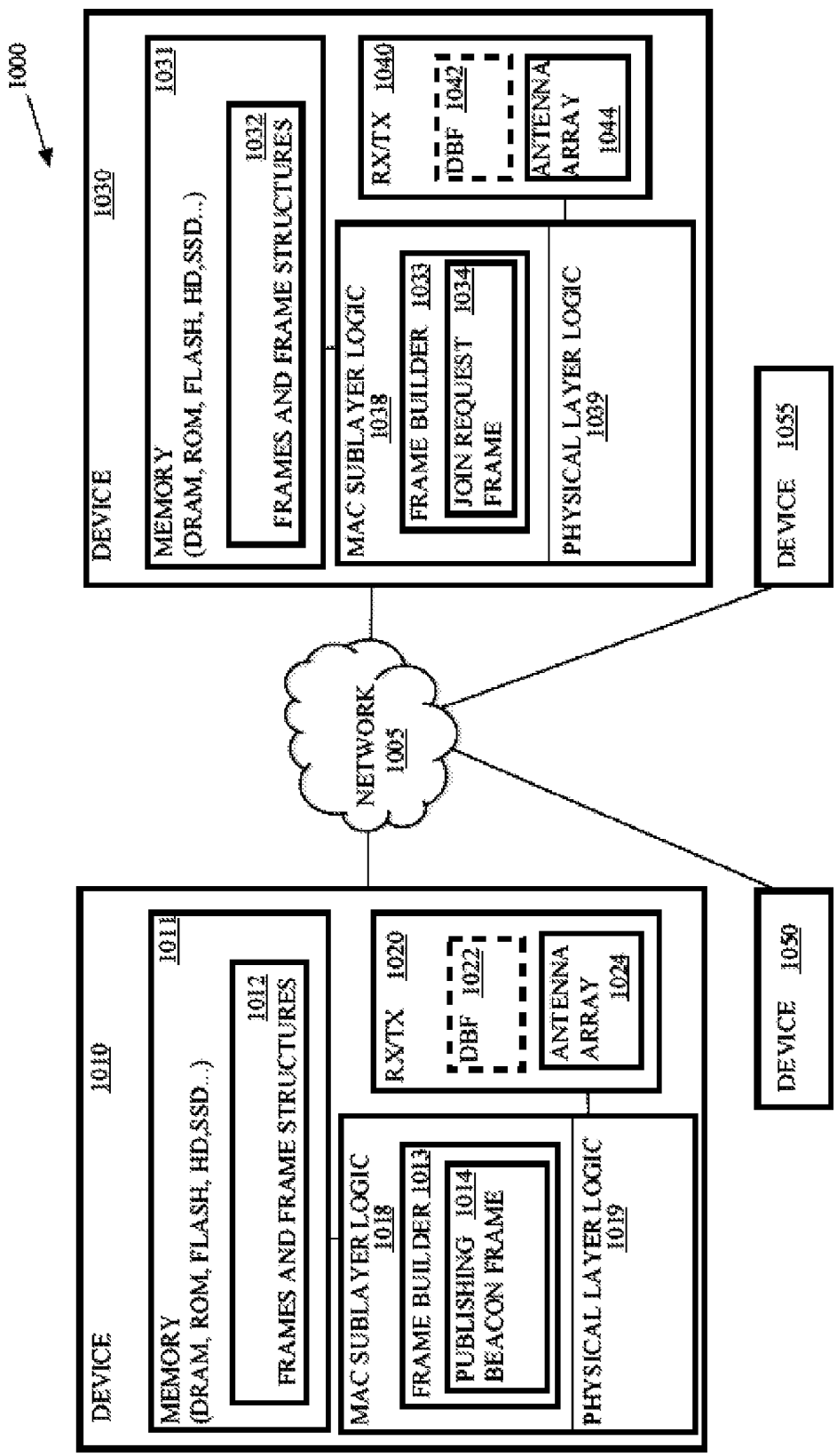
FIG. 13 illustrates generally an example of a wireless communication system.

FIG. 13 illustrates generally an embodiment of a wireless communication system 1000. In certain examples, the wireless communication system 1000 can include a communications device 1010 that may be wire line and wirelessly connected to a network 1005. In certain examples, the communications device 1010 can communicate wirelessly with a plurality of communication devices 1030, 1050, and 1055 via the network 1005. In some examples, the communications device 1010 can include a mobile phone. In an example, the communications device 1030 can include a low power communications device such as a sensor, a consumer electronics device, a personal mobile device, or the like. In certain examples, communications devices 1050 and 1055 can include sensors, stations, access points, hubs, switches, routers, computers, laptops, netbooks, cellular phones, smart phones, PDAs (Personal Digital Assistants), or other wireless-capable devices. Thus, communications devices can be mobile or fixed.

Initially, in certain examples, the communications device 1010 can transmit a publishing beacon frame 1014 and the communications device 1030 can receive the publishing beacon frame 1014. Based upon a publishing window indicated in the publishing beacon frame 1014, in some examples, the communications device 1030 can generate a join request frame 1034 and transmit the join request frame 1034 to the communications device 1010 to request association with the publishing group advertised in the publishing beacon 1014. In certain examples, the communications device 1010 can respond with a join response frame that comprises a frame informing the communications device 1030 of the decision to join the publishing group such as an acceptance to the group or a denial of the request to join.

Once the communications device 1030 associates with the communications device 1010, the communications device 1030 may periodically transmit a PB at a TPBTT assigned to the communications device 1030. In some embodiments, device 1050 can be a member of the publishing group and can respond to a PB with an ACK during the publishing window. In several embodiments, device 1030 can request a contact with device 1010 with a contact request frame during contact windows of the publishing beacon interval. In some examples, the communications device 1010 can transmit a contact response frame to the communications device 1030 in response to the contact request frame. If communications device 1010 accepts the contact request, communications device 1010 can transmit data to communications device 1030 during the contact windows time period defined in the PB. In some embodiments, the communications device 1030 can respond with an ACK and/or data.

The network 1005 may represent an interconnection of a number of networks. For instance, in certain examples, the network 1005 can couple with a wide area network such as the Internet or an intranet and can interconnect local devices wired or wirelessly interconnected via one or more hubs, routers, or switches. In the present embodiment, network 1005 can communicatively couple communications devices 1010, 1030, 1050, and 1055.

The communication devices 1010 and 1030 can comprise memory 1011 and 1031, and Media Access Control (MAC) sublayer logic 1018 and 1038, respectively. In certain examples, the memory 1011 and 1031 can include a storage medium such as Dynamic Random Access Memory (DRAM), read only memory (ROM), buffers, registers, cache, flash memory, hard disk drives, solid-state drives, or the like. In some examples, the memory 1011 and 1031 can store the frames and/or frame structures, or portions thereof such as a publishing beacon, join request, join response, contact request, and contact response frames such as those illustrated generally in FIGS. 8-12.

In certain examples, the MAC sublayer logic 1018, 1038 can include logic to implement functionality of the MAC sublayer of the data link layer of the communications device 1010, 1030. In some examples, the MAC sublayer logic 1018, 1038 can generate the frames such as management frames and the physical layer logic 1019, 1039 may generate physical layer protocol data units (PPDUs) based upon the frames. More specifically, the frame builders 1013 and 1033 may generate frames 1014, 1034 and the data unit builders of the physical layer logic 1019, 1039 may encapsulate the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

In certain examples, FIG. 13 can depict a number of different embodiments including a Multiple-Input, Multiple-Output (MIMO) system with, e.g., four spatial streams, and can depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. In certain examples, the nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. In certain examples, each spatial channel so formed may carry information to one or more of the communications devices 1030, 1050, and 1055. Similarly, the communications device 1030 comprises a transceiver 1040 to receive and transmit signals from and to the communications device 1010. In some examples, the transceiver 1040 may comprise an antenna array 1044 and, optionally, a DBF 1042.

EXAMPLES AND ADDITIONAL NOTES

In Example 1, a method for synched distributed advertisement among peer-to-peer wireless devices can include transmitting, from a first device of a publishing group, at a group publishing beacon interval (T), a first publishing beacon (PB) including social information of the first device and social information of (N−1) other devices. The group publishing beacon interval (T) can represent an interval of time between each successive publishing beacon transmission of the publishing group, and the first publishing beacon and the each successive publishing beacon can include a first value representative of the group publishing beacon interval (T).

In Example 2, the N of Example 1 optionally is an integer value greater than zero, can represent the number of devices in the publishing group when the first publishing beacon is transmitted, and the (N−1) other devices can belong to the publishing group.

In Example 3, the method of any one or more of Examples 1-2 optionally include receiving a join request from an (N+1) device, wherein the (N+1) device does not belong to the publishing group when the join request is received.

In Example 4, the receiving the join request of any one or more of Examples 1-3 optionally includes receiving the join request during a publishing group window prior to transmitting a second publishing beacon from the first device.

In Example 5, the receiving the join request of any one or more of Examples 1-4 optionally includes receiving social information of the (N+1) device.

In Example 6, the second publishing beacon of any one or more of Examples 1-5 optionally includes the social information of the (N+1) device.

In Example 7, the receiving the join request of any one or more of Examples 1-6 optionally includes incrementing the number of devices in the publishing group to account for the N+1 device.

In Example 8, the method of any one or more of Examples 1-7 optionally includes transmitting a subsequent publishing beacon from the (N+1) device at an interval of time subsequent to the transmitting of the second publishing beacon, wherein the interval of time is about N*T, and wherein T is the group publishing beacon interval (T).

In Example 9, the method of any one or more of Examples 1-8 optionally includes transmitting a subsequent publishing beacon from the (N+1) device at an interval of time subsequent to the transmitting of the second publishing beacon, wherein the interval of time is about N*N*T, and wherein T is the group publishing beacon interval (T).

In Example 10, the method of any one or more of Examples 1-9 optionally includes receiving (N−1) publishing beacons from the (N−1) other devices at the (N+1) device and the first device after the transmitting of the second publishing beacon, wherein each of the (N−1) publishing beacons include the social information of the (N+1) device.

In Example 11, the method of any one or more of Examples 1-10 optionally includes incrementing the number of devices in the publishing group after the transmitting of the second publishing beacon from the first device and after subsequently receiving the (N−1) publishing beacons from the (N−1) other devices.

In Example 12, the method of any one or more of Examples 1-11 optionally includes transmitting subsequent join requests to each of the (N−1) other devices during a publishing group window associated with each of the (N−1) other devices.

In Example 13, the each successive publishing beacon of any one or more of Examples 1-12 optionally includes a second value representative of the number of devices in the publishing group.

In Example 14, the each successive publishing beacon of any one or more of Examples 1-13 optionally includes a third value representative of a duration of a publishing group window, wherein the publishing group window of any one or more of Examples 1-13 optionally begins prior to a transmission of a publishing beacon from the first device or a transmission of a publishing beacon from one of the (N−1) other devices.

In Example 15, a method for synched distributed advertisement among peer-to-peer wireless devices can include receiving a first publishing beacon at a first device from a second device, wherein the second device can belong to a publishing group, and wherein the first device does not belong to the publishing group. The method can include transmitting during a publishing group window of the publishing group a join request from the first device, wherein the publishing group window includes an interval of time before a target publishing beacon transmit time (TPBTT) of the publishing group.

In Example 16, the method of any one or more of Examples 1-15 optionally includes receiving a second publishing beacon including social information of the first device at the first device from a third device, the third device belonging to the publishing group.

In Example 17, the method of any one or more of Examples 1-16 optionally includes transmitting, from the first device, at a publishing beacon interval, a third publishing beacon (PB) including social information of the first device and social information of the second and third devices.

In Example 18, the second and third device of any one or more of Examples 1-17 are the same device.

In Example 19, a method for synched distributed advertisement among peer-to-peer wireless devices can include receiving one or more publishing beacons at a first device, each publishing beacon of the one or more publishing beacons indicative of an up-chain device belonging to a publishing group, adjusting an indication using the first device indicating the up-chain device failed to transmit a publishing beacon after not receiving a publishing beacon from the up-chain device, transmitting a first publishing beacon at a target publishing beacon transmit time (TPBTT) of the up-chain device, wherein the first publishing beacon does not include social information of the up-chain device, transmitting a second publishing beacon at a TPBTT of the first device, wherein the second publishing beacon does not include the social information of the up-chain device, and decrementing a total number of devices in the publishing group to indicate that the up-chain device no longer belongs to the publishing group.

In Example 20, the adjusting the indication using the first device of any one or more of Examples 1-19 optionally includes indicating the up-chain device failed to transmit two or more consecutive publishing beacons after not receiving the two or more anticipated consecutive publishing beacons from the up-chain device.

In Example 21, a wireless communication device configured for synched distributed advertisement within a publishing group can include a transceiver configured to receive a first publishing beacon from a publishing group including a number of other wireless devices, and to transmit a first join request during a publishing group window of one of the number of other wireless devices using information received in the first publishing beacon, wherein the join request includes social information of the wireless communication device, and wherein a value representative of a publishing beacon interval (T) between publishing beacons of the publishing group is included in the first publishing beacon.

In Example 22, the transceiver of any one or more of Examples 1-21 optionally is configured to receive a second publishing beacon from the one of the number of other wireless devices, wherein the second publishing beacon includes the social information of the wireless communication device.

In Example 23, the transceiver of any one or more of Examples 1-22 optionally is configured to transmit a third publishing beacon at a first time interval after receiving the second publishing beacon, and wherein the first time interval is about N*T, where N represents the number of devices in the publishing group when the first publishing beacon was received.

In Example 24, the transceiver of any one or more of Examples 1-23 optionally is configured to transmit a third publishing beacon at a first time interval after receiving the second publishing beacon, wherein the first time interval is about N*N*T, where N represents the number of devices in the publishing group when the first publishing beacon was received.

In Examples 25, a wireless communication device configured for synched distributed advertisement within a publishing group can include a processor, memory coupled to the processor, a transceiver configured for providing wireless communications of information stored in, and retrieved from, the memory, and wherein the transceiver is configured to receive a first publishing beacon from a publishing group including a number of other wireless devices, and to transmit a first join request during a publishing group window of one of the number of other wireless devices using information received in the first publishing beacon, wherein the join request includes social information of the wireless communication device, wherein the memory is configured to store the social information of the wireless communication device, and wherein a value representative of a publishing beacon interval (T) between publishing beacons of the publishing group is included in the first publishing beacon.

In Example 26, the transceiver of any one or more of Examples 1-25 optionally is configured to receive a second publishing beacon from the one of the number of other wireless devices, the second publishing beacon including the social information of the wireless communication device.

In Example 27, the transceiver of any one or more of Examples 1-26 optionally is configured to transmit a third publishing beacon at a first time interval after receiving the second publishing beacon, wherein the first time interval is about N*T, where N represents the number of devices in the publishing group when the first publishing beacon was received.

In Example 28, the transceiver of any one or more of Examples 1-27 optionally is configured to transmit a third publishing beacon at a first time interval after receiving the second publishing beacon, wherein the first time interval is about N*N*T, where N represents the number of devices in the publishing group when the first publishing beacon was received.

In Example 29, a method can include transmitting a publishing beacon, receiving a join request from a new device, determining a power of the publishing beacon received by the new device, determining transmission power information of the new device, determining a response to the join request based upon the power of the publishing beacon received by the new device and the transmission power information of the new device, and transmitting a response to the join request to the new device.

In Example 30, the method of any one or more of Examples 1-29 optionally includes receiving an acknowledgement from a member device in response to the publishing beacon.

In Example 31, the method of any one or more of Examples 1-30 optionally includes storing, by the medium access control sublayer logic, at least part of the frame in memory.

In Example 32, the method of any one or more of Examples 1-31 optionally includes comprising receiving a contact request from a member device.

In Example 33, the method of any one or more of Examples 1-32 optionally includes transmitting a contact response to a member device in response to receiving a contact request frame from the member device.

In Example 34, the method of any one or more of Examples 1-33 optionally includes transmitting data to a member device in response to receiving a contact request frame from the member device.

In Example 35, the method of any one or more of Examples 1-34 optionally includes receiving data from a member device in response to transmitting a contact response frame to the member device.

In Example 36, the method of any one or more of Examples 1-35 optionally includes receiving an acknowledgement from a member device in response to transmitting a contact response frame to the member device.

In Example 37, a device can include a memory and a medium access control sublayer logic coupled with the memory. The medium access control sublayer logic coupled with the memory can be arranged to transmit a publishing beacon, receive a join request from a new device, determine a power of the publishing beacon received by the new device, determine transmission power information of the new device; determine a response to the join request based upon the power of the publishing beacon received by the new device and the transmission power information of the new device, and transmit a response to the join request to the new device.

In Example 38, the device of any one or more of Examples 1-37 optionally includes a transmitter coupled with the medium access control logic to transmit the frame.

In Example 39, the device of any one or more of Examples 1-38 optionally includes an antenna coupled with the transmitter to transmit the frame.

In Example 40, the medium access control sublayer logic of any one or more of Examples 1-39 optionally is coupled with the memory to store at least a portion of the frame.

In Example 41, the medium access control logic of any one or more of Examples 1-40 optionally includes logic to receive a contact request from a member device.

In Example 42, the medium access control logic of any one or more of Examples 1-41 optionally includes logic to transmit a contact response to a member device in response to receiving a contact request frame from the member device.

In Example 43, the medium access control logic of any one or more of Examples 1-42 optionally includes logic to transmit data to a member device in response to receiving a contact request frame from the member device.

In Example 44, the medium access control logic of any one or more of Examples 1-43 optionally includes logic to receive data from a member device in response to transmitting a contact response frame to the member device.

In Example 45, the medium access control logic of any one or more of Examples 1-44 optionally includes logic to receive an acknowledgement from a member device in response to transmitting a contact response frame to the member device.

In Example 46, a method can include receiving a publishing beacon from a member device, determining a publishing window from the publishing beacon, transmitting a join request frame during the publishing window, and receiving a join response frame from a member device.

In Example 47, the method of any one or more of Examples 1-46 optionally includes receiving, by the antenna, the frame encapsulated by the preamble.

In Example 48, the method of any one or more of Examples 1-47 optionally includes comprising transmitting a publishing beacon to a publishing group address.

In Example 49, the method of any one or more of Examples 1-48 optionally includes transmitting an acknowledgement to a member device in response to transmission of a publishing beacon from the member device.

In Example 50, the method of any one or more of Examples 1-49 optionally includes receiving a join request from another device.

In Example 51, the method of any one or more of Examples 1-50 optionally includes transmitting a join response to the other device.

In Example 52, the method of any one or more of Examples 1-51 optionally includes receiving a contact request from a member device.

In Example 53, the method of any one or more of Examples 1-52 optionally includes transmitting a contact response to a member device in response to receiving a contact request frame from the member device.

In Example 54, the method of any one or more of Examples 1-53 optionally includes transmitting data to a member device in response to receiving a contact request frame from the member device.

In Example 55, the method of any one or more of Examples 1-54 optionally includes receiving data from a member device in response to transmitting a contact response frame to the member device.

In Example 56, the method of any one or more of Examples 1-55 optionally includes receiving an acknowledgement from a member device in response to transmitting a contact response frame to the member device.

In Example 57, a device can include and a medium access control sublayer logic coupled with the memory. The medium access control sublayer logic coupled with the memory can be arranged to receive a publishing beacon from a member device; determine a publishing window from the publishing beacon; transmit a join request frame during the publishing window; and receive a join response frame from a member device.

In Example 58, the device of any one or more of Examples 1-57 optionally includes a transmitter coupled with the medium access control logic to transmit the frame.

In Example 59, the device of any one or more of Examples 1-58 optionally includes an antenna coupled with the transmitter to transmit the frame.

In Example 60, the medium access control logic of any one or more of Examples 1-59 optionally includes logic to store in the memory, a field value defined in the frame for transmitting a physical layer protocol data unit.

In Example 61, the medium access control logic of any one or more of Examples 1-60 optionally includes logic to transmit a publishing beacon to a publishing group address.

In Example 62, the medium access control logic of any one or more of Examples 1-61 optionally includes logic to transmit an acknowledgement to a member device in response to transmission of a publishing beacon from the member device.

In Example 63, the medium access control logic of any one or more of Examples 1-62 optionally includes logic to receive a join request from another device.

In Example 64, the medium access control logic of any one or more of Examples 1-63 optionally includes logic to transmit a join response to the other device.

In Example 65, the medium access control logic of any one or more of Examples 1-64 optionally includes logic to receive a contact request from a member device.

In Example 66, the medium access control logic of any one or more of Examples 1-65 optionally includes logic to transmit a contact response to a member device in response to receiving a contact request frame from the member device.

In Example 67, the medium access control logic of any one or more of Examples 1-66 optionally includes logic to transmit data to a member device in response to receiving a contact request frame from the member device.

In Example 68, the medium access control logic of any one or more of Examples 1-67 optionally includes logic to receive data from a member device in response to transmitting a contact response frame to the member device.

In Example 69, the medium access control logic of any one or more of Examples 1-68 optionally includes logic to receive an acknowledgement from a member device in response to transmitting a contact response frame to the member device.

In Example 70, A program product of generating a waveform for proximity-based, information discovery can include a storage medium comprising instructions to be executed by a processor-based device, wherein the instructions, when executed by the processor-based device, perform operations. The operations can include receiving a publishing beacon from a member device, determining a publishing window from the publishing beacon, transmitting a join request frame during the publishing window, and receiving a join response frame from a member device.

In Example 71, the medium of any one or more of Examples 1-70 optionally includes receiving, by the antenna, the frame encapsulated by the preamble.

In Example 72, the medium of any one or more of Examples 1-71 optionally includes transmitting a publishing beacon to a publishing group address.

In Example 73, the medium of any one or more of Examples 1-72 optionally includes transmitting an acknowledgement to a member device in response to transmission of a publishing beacon from the member device.

In Example 74, the medium of any one or more of Examples 1-73 optionally includes receiving a join request from another device.

In Example 75, the medium of any one or more of Examples 1-74 optionally includes transmitting a join response to the other device.

In Example 76, the medium of any one or more of Examples 1-75 optionally includes receiving a contact request from a member device.

In Example 77, the medium of any one or more of Examples 1-76 optionally includes transmitting a contact response to a member device in response to receiving a contact request frame from the member device.

In Example 78, the medium of any one or more of Examples 1-77 optionally includes transmitting data to a member device in response to receiving a contact request frame from the member device.

In Example 79, the medium of any one or more of Examples 1-78 optionally includes receiving data from a member device in response to transmitting a contact response frame to the member device.

In Example 80, a program product of generating a waveform for proximity-based, information discovery can include a storage medium comprising instructions to be executed by a processor-based device, wherein the instructions, when executed by the processor-based device, perform operations. The operations can include transmitting a publishing beacon, receiving a join request from a new device, determining a power of the publishing beacon received by the new device, determining transmission power information of the new device, determining a response to the join request based upon the power of the publishing beacon received by the new device and the transmission power information of the new device, and transmitting a response to the join request to the new device.

In Example 81, the medium of any one or more of Examples 1-80 optionally includes receiving, by the antenna, a frame encapsulated by a preamble.

In Example 82, the medium of any one or more of Examples 1-81 optionally includes receiving an acknowledgement from a member device in response to the publishing beacon.

In Example 83, the medium of any one or more of Examples 1-82 optionally includes storing, by the medium access control sublayer logic, at least part of the frame in memory.

In Example 84, the medium of any one or more of Examples 1-83 optionally includes receiving a contact request from a member device.

In Example 85, the medium of any one or more of Examples 1-84 optionally includes transmitting a contact response to a member device in response to receiving a contact request frame from the member device.

In Example 86, the medium of any one or more of Examples 1-85 optionally includes transmitting data to a member device in response to receiving a contact request frame from the member device.

In Example 87, the medium of any one or more of Examples 1-86 optionally includes receiving data from a member device in response to transmitting a contact response frame to the member device.

In Example 88, the medium of any one or more of Examples 1-87 optionally includes receiving an acknowledgement from a member device in response to transmitting a contact response frame to the member device.

Example 89 can include, or can optionally be combined with any portion or combination of any portions of any one or more of Examples 1 through 88 to include, subject matter that can include means for performing any one or more of the functions of Examples 1 through 88, or a machine-readable medium including instructions that, when performed by a machine, cause the machine to perform any one or more of the functions of Examples 1 through 88.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The above detailed description includes references to the accompanying drawings, which form a part of the detailed description. The drawings show, by way of illustration, specific embodiments in which the subject matters can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The above description is intended to be illustrative, and not restrictive. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for synched distributed advertisement among peer-to-peer wireless devices, the method comprising:
   transmitting, from a first device of a publishing group, at the beginning or end of a group publishing beacon interval (T), a first publishing beacon (PB) including social information of the first device and social information of (N−1) other devices;
   adding an (N+1) device to the group;
   transmitting a second publishing beacon from the first device;
   transmitting a subsequent publishing beacon from the (N+1) device at an interval of time subsequent to transmission of the second publishing beacon, wherein the interval of time is N*T or 2*N*T, and wherein T is the group publishing beacon interval (T);

wherein the group publishing beacon interval (T) represents an interval of time between each successive publishing beacon transmission of the publishing group; and wherein the first publishing beacon and the each successive publishing beacon includes a first value representative of the group publishing beacon interval (T).

2. The method of claim 1, wherein N is an integer value greater than zero;

wherein N represents the number of devices in the publishing group when the first publishing beacon is transmitted; and wherein the (N−1) other devices belong to the publishing group.

3. The method of claim 1, wherein the adding n (N+1) device includes receiving a join request from an (N+1) device, wherein the (N+1) device does not belong to the publishing group when the join request is received.

4. The method of claim 3, wherein receiving the join request includes receiving the join request during a publishing group window prior to transmitting the second publishing beacon from the first device.

5. The method of claim 4, wherein receiving the join request includes receiving social information of the (N+1) device.

6. The method of claim 5, wherein the second publishing beacon includes the social information of the (N+1) device.

7. The method of claim 6, wherein receiving the join request includes incrementing the number of devices in the publishing group to account for the (N+1) device.

8. The method of claim 1, wherein the interval of time is 2*N*T; and wherein the method includes receiving (N−1) publishing beacons from the (N−1) other devices at the (N+1) device and the first device after transmission of the second publishing beacon, wherein each of the (N−1) publishing beacons include the social information of the (N+1) device.

9. The method of claim 8, including incrementing the number of devices in the publishing group after transmission of the second publishing beacon from the first device and after subsequently receiving the (N−1) publishing beacons from the (N−1) other devices.

10. The method of claim 1, wherein the interval of time is 2*N*T; and wherein the method includes transmitting subsequent join requests to each of the (N−1) other devices during a publishing group window associated with each of the (N−1) other devices.

11. The method of claim 1, wherein the each successive publishing beacon includes a second value representative of the number of devices in the publishing group.

12. The method of claim 1, wherein the each successive publishing beacon includes a third value representative of a duration of a publishing group window, wherein the publishing group window begins prior to a transmission of a publishing beacon from the first device or a transmission of a publishing beacon from one of the (N−1) other devices.

13. A wireless communication device configured for synched distributed advertisement within a publishing group, the wireless communication device comprising:

an transceiver configured to receive a first publishing beacon from a publishing group including a number of other wireless devices, and to transmit a first join request during a publishing group window of one of the number of other wireless devices using information received in the first publishing beacon, wherein the join request includes social information of the wireless communication device, and wherein a value representative of a publishing beacon interval (T) between publishing beacons of the publishing group is included in the first publishing beacon;

wherein the transceiver is configured to receive a second publishing beacon from the one of the number of other wireless devices wherein the second publishing beacon includes the social information of the wireless communication device;

wherein the transceiver is configured to transmit a third publishing beacon at a first time interval after receiving the second publishing beacon; and wherein the first time interval is N*T or 2*N*T, where N represents the number of devices in the publishing group when the first publishing beacon was received.

14. A wireless communication device configured for synched distributed advertisement within a publishing group, the wireless communication device comprising:

a processor;

memory coupled to the processor;

an transceiver configured for providing wireless communications of information stored in, and retrieved from, the memory;

wherein the transceiver is configured to receive a first publishing beacon from a publishing group including a number of other wireless devices, and to transmit a first join request during a publishing group window of one of the number of other wireless devices using information received in the first publishing beacon, wherein the join request includes social information of the wireless communication device, wherein the memory is configured to store the social information of the wireless communication device, and wherein a value representative of a publishing beacon interval (T) between publishing beacons of the publishing group is included in the first publishing beacon;

wherein the transceiver is configured to receive a second publishing beacon from the one of the number of other wireless devices, the second publishing beacon including the social information of the wireless communication device;

wherein the transceiver is configured to transmit a third publishing beacon at a first time interval after receiving the second publishing beacon; and wherein the first time interval is N*T or 2*N*T, where N represents the number of devices in the publishing group when the first publishing beacon was received.

15. A non-transitory computer-readable storage medium that stores instructions for execution by one or more processors to perform operations for synched distributed advertisement, the operations configure to:

transmit, from a first device of a publishing group, at the beginning or end of a group publishing beacon interval (T), a first publishing beacon (PB) including social information of the first device and social information of (N−1) other devices;

add an (N+1) device to the group;

transmit a second publishing beacon from the first device;

transmit a subsequent publishing beacon from the (N+1) device at an interval of time subsequent to transmission of the second publishing beacon, wherein the interval of time is N*T or 2*N*T, and wherein T is the group publishing beacon interval (T);

wherein the group publishing beacon interval (T) represents an interval of time between each successive publishing beacon transmission of the publishing group; and wherein the first publishing beacon and the each successive publishing beacon includes a first value representative of the group publishing beacon interval (T).

16. A non-transitory computer-readable storage medium that stores instructions for execution by one or more processors to perform operations for synched distributed advertisement, the operations configure to:

transmit, from a first device of a publishing group, at the beginning or end of a group publishing beacon interval (T), a first publishing beacon (PB) including social information of the first device and social information of (N−1) other devices;

wherein the group publishing beacon interval (T) represents an interval of time between each successive publishing beacon transmission of the publishing group;

wherein the first publishing beacon and the each successive publishing beacon includes first value representative of the group publishing beacon interval (T); and wherein the each successive publishing beacon includes a second value representative of a duration of a publishing group window, wherein the publishing group window begins prior to a transmission of a publishing beacon from the first device or a transmission of a publishing beacon from one of the (N−1) other devices.

\* \* \* \* \*